(12) United States Patent
Ishii et al.

(10) Patent No.: US 7,998,011 B2
(45) Date of Patent: Aug. 16, 2011

(54) SPEED CHANGE APPARATUS

(75) Inventors: Takuya Ishii, Anjo (JP); Minoru Todo, Takahama (JP)

(73) Assignee: Aisin AW Co., Ltd., Anjo (JP)

( * ) Notice: Subject to any disclaimer, the term of this patent is extended or adjusted under 35 U.S.C. 154(b) by 455 days.

(21) Appl. No.: 12/314,057

(22) Filed: Dec. 3, 2008

(65) Prior Publication Data

US 2009/0170652 A1    Jul. 2, 2009

(30) Foreign Application Priority Data

Dec. 28, 2007   (JP) ................. 2007-338776

(51) Int. Cl.
*F16H 31/00*   (2006.01)
*F16D 47/04*   (2006.01)

(52) U.S. Cl. .................................. 475/146; 192/48.609

(58) Field of Classification Search .................. 475/146
See application file for complete search history.

(56) References Cited

U.S. PATENT DOCUMENTS

| | | | |
|---|---|---|---|
| 4,732,253 A | 3/1988 | Hiramatsu et al. | |
| 5,232,418 A * | 8/1993 | Aoki et al. ................. | 475/271 |
| 2005/0167234 A1 | 8/2005 | Aoki et al. | |
| 2006/0264297 A1 | 11/2006 | Seki et al. | |
| 2007/0102257 A1 | 5/2007 | Aoki et al. | |

FOREIGN PATENT DOCUMENTS

| | | |
|---|---|---|
| JP | A-62-52249 | 3/1987 |
| JP | A-04-262125 | 9/1992 |
| JP | A-2003-343598 | 12/2003 |
| JP | A-2005-207579 | 8/2005 |
| JP | A-2006-349162 | 12/2006 |

* cited by examiner

*Primary Examiner* — Dirk Wright (74) *Attorney, Agent, or Firm* — Oliff & Berridge, PLC (57) ABSTRACT

A speed change apparatus includes a first clutch having a first clutch drum, in which an annular clutch plate is spline-fitted to an inner peripheral surface of the first clutch drum, and a clutch piston formed with a spline on an inner peripheral surface of the clutch piston is provided to slide in an axial direction and press the clutch plate; and a second clutch having a second clutch drum, which is disposed in the clutch piston of the first clutch concentrically with the first clutch, and in which a spline is formed on inner and outer peripheral surfaces of the second clutch drum such that outer peripheral surface spline teeth form inner peripheral surface spline grooves. Wherein the outer peripheral surface of the second clutch drum is spline-fitted to the inner peripheral surface of the clutch piston and an annular clutch plate is spline-fitted to the inner peripheral surface of the second clutch drum.

14 Claims, 6 Drawing Sheets

|  | C1 | C2 | C3 | C4 | B1 | B2 | F1 |
|---|---|---|---|---|---|---|---|
| N |  |  |  |  |  |  |  |
| 1ST | O |  |  |  |  | (O) | O |
| 2ND | O |  |  |  | O |  |  |
| 3RD | O |  | O |  |  |  |  |
| 4TH | O |  |  | O |  |  |  |
| 5TH | O | O |  |  |  |  |  |
| 6TH |  | O |  | O |  |  |  |
| 7TH |  | O | O |  |  |  |  |
| 8TH |  | O |  |  | O |  |  |
| REV1 |  |  | O |  |  | O |  |
| REV2 |  |  |  | O |  | O |  |

(O) DURING ENGINE BRAKING

_SPEED CHANGE APPARATUS_

INCORPORATION BY REFERENCE

The disclosure of Japanese Patent Application No. 2007-338776 filed on Dec. 28, 2007 including the specification, drawings and abstract is incorporated herein by reference in its entirety.

BACKGROUND

The present invention relates to a speed change apparatus.

There exits a speed change apparatus that is installed in an automobile and that changes a shift speed by switching the engagement of a plurality of clutches (see Japanese Patent Application Publication No. JP-A-2006-349162, for example). A clutch provided in this speed change apparatus is a multi-plate clutch in which a plurality of clutch plates are disposed alternately on a clutch drum attached to one rotary body and a clutch hub is attached to another rotary body. The two rotary bodies are connected by pressing the clutch plates using a clutch piston.

SUMMARY

In this type of speed change apparatus, two clutch drums are disposed in two concentric layers such that two clutches can be accommodated in a compact manner, thereby reducing the overall size of the apparatus. However, when clutch drums are disposed in two layers, the size of each clutch drum in a radial direction is restricted, and a required torque capacity (a contact area between the clutch plates) must be secured within the range of this restriction. It is possible to increase the number of clutch plates, but in so doing, the overall length of the apparatus (the axial direction length) increases.

An object of a speed change apparatus according to the present invention is to achieve a reduction in the size of the apparatus while securing a required torque capacity. The present invention can also achieve various other advantages.

According to an exemplary aspect of the invention, speed change apparatus includes a first clutch having a first clutch drum, in which an annular clutch plate is spline-fitted to an inner peripheral surface of the first clutch drum, and a clutch piston formed with a spline on an inner peripheral surface of the clutch piston is provided to slide in an axial direction and press the clutch plate; and a second clutch having a second clutch drum, which is disposed in the clutch piston of the first clutch concentrically with the first clutch, and in which a spline is formed on inner and outer peripheral surfaces of the second clutch drum such that outer peripheral surface spline teeth form inner peripheral surface spline grooves. Wherein the outer peripheral surface of the second clutch drum is spline-fitted to the inner peripheral surface of the clutch piston and an annular clutch plate is spline-fitted to the inner peripheral surface of the second clutch drum.

BRIEF DESCRIPTION OF THE DRAWINGS

Various exemplary aspects of the invention will be described with reference to the drawings, wherein.

DETAILED DESCRIPTION OF EMBODIMENTS

Next, a detailed description of the preferred embodiment will be described using an embodiment of the present invention.

Figure 1:
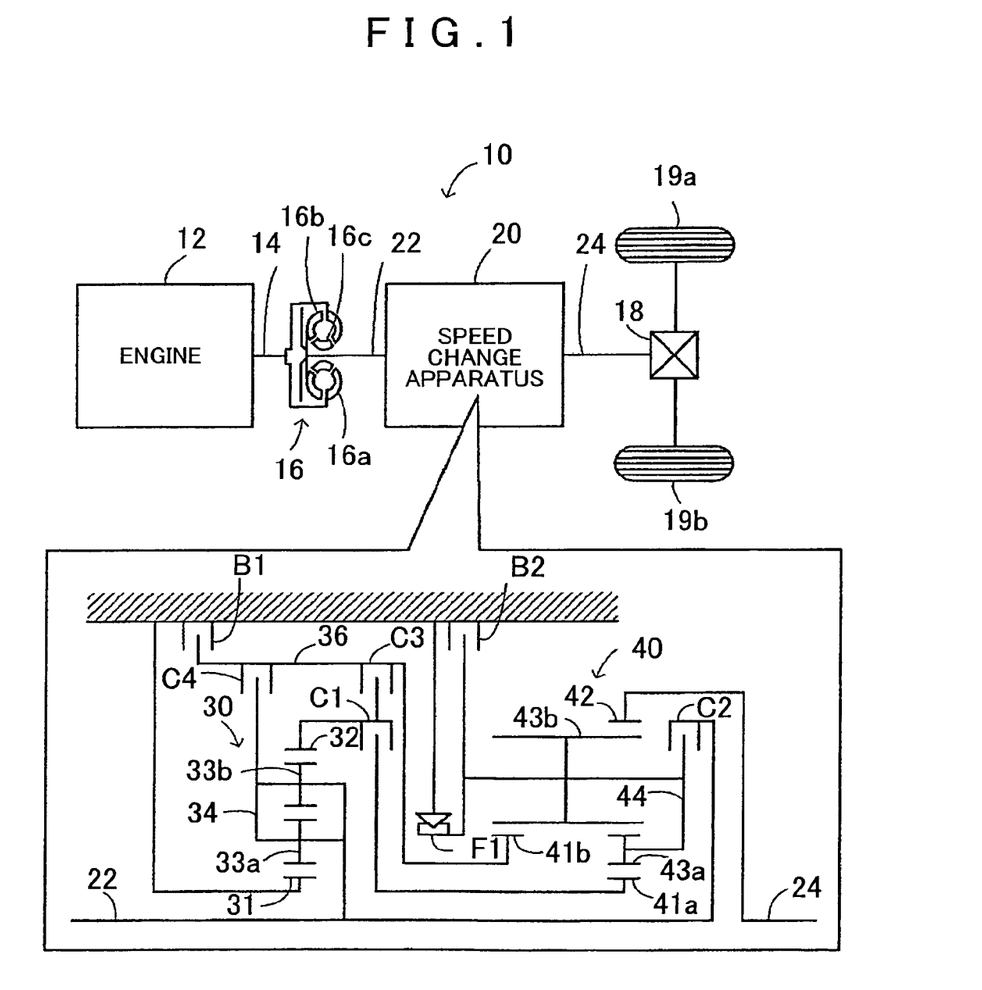
FIG. 1 is a schematic diagram showing the structure of an automobile in which a speed change apparatus serving as an embodiment of the present invention is installed.

FIG. 1 is a schematic diagram showing the structure of an automobile 10 in which a speed change apparatus 20 serving as an embodiment of the present invention is installed. As shown in the drawing, the automobile 10 according to this embodiment includes an engine 12 serving as an internal combustion engine that outputs power by igniting and burning a hydrocarbon-based fuel such as gasoline or light oil, a torque converter 16 attached to a crankshaft 14 of the engine 12, and the speed change apparatus 20, which serves as a stepped transmission in which an input shaft 22 is connected to an output side of the torque converter 16 and an output shaft 24 is connected to drive wheels 19a, 19b via a differential gear 18, and which changes the speed of power input into the input shaft 22 and transmits the speed-changed power to the output shaft 24. The automobile 10 is a front engine rear drive (FR) automobile in which the engine 12 and the speed change apparatus 20 are disposed vertically such that the crankshaft 14 of the engine 12 (the input shaft 22 and the output shaft 24 of the speed change apparatus 20) intersects an axle at right angles.

The torque converter 16 includes a pump impeller 16a connected to the crankshaft 14 side of the engine 12, a turbine runner 16b connected to the input shaft 22 side of the speed change apparatus 20, and a stator 16c interposed between the pump impeller 16a and the turbine runner 16b, and transmits power between the crankshaft 14 of the engine 12 and the input shaft 22 of the speed change apparatus 20 in accordance with torque amplification via oil filled in the interior thereof.

The speed change apparatus 20 is an eight-speed stepped transmission driven by oil pressure from a hydraulic circuit, not shown in the drawing, and includes a double-pinion type planetary gear mechanism 30, a Ravigneaux type planetary gear mechanism 40, four clutches C1, C2, C3, C4, two brakes B1, B2, and a one-way clutch F1. The double-pinion type planetary gear mechanism 30 includes a sun gear 31 serving as an external gear, a ring gear 32 serving as an internal gear disposed concentrically with the sun gear 31, a plurality of first pinion gears 33a that mesh with the sun gear 31, a plurality of second pinion gears 33b that mesh with the first pinion gears 33a and the ring gear 32, and a carrier 34 that connects the plurality of first pinion gears 33a to the plurality of second pinion gears 33b and carries the first and second pinion gears 33a, 33b so as to be free to rotate and revolve. The sun gear 31 is fixed to a case and connected to a rotary shaft 36 via the clutch C3, and the carrier 34 is connected to the rotary shaft 36 via the clutch C4. The rotary shaft 36 can be rotated freely or fixed by switching the brake B1 ON and OFF. The Ravigneaux type planetary gear mechanism 40 includes two sun gears 41a, 41b serving as external gears, a ring gear 42 serving as an internal gear, a plurality of short pinion gears 43a that mesh with the sun gear 41a, a plurality of long pinion gears 43b that mesh with the sun gear 41b, the plurality of short pinion gears 43a, and the ring gear 42, and a carrier 44 that connects the plurality of short pinion gears 43a to the plurality of long pinion gears 43b and carries the plurality of pinion gears 43a, 43b so as to be free to rotate and revolve. The sun gear 41a is connected to the ring gear 32 of the double-pinion type planetary gear mechanism 30 via the clutch C1. The sun gear 41b is connected to the rotary shaft 36. The ring gear 42 is connected to the output shaft 24. The carrier 44 is connected to the input shaft 22 via the clutch C2, and rotation thereof can be limited to a single direction by the one-way clutch F1, and permitted freely or fixed by switching the brake B2 ON and OFF.

Figure 2:
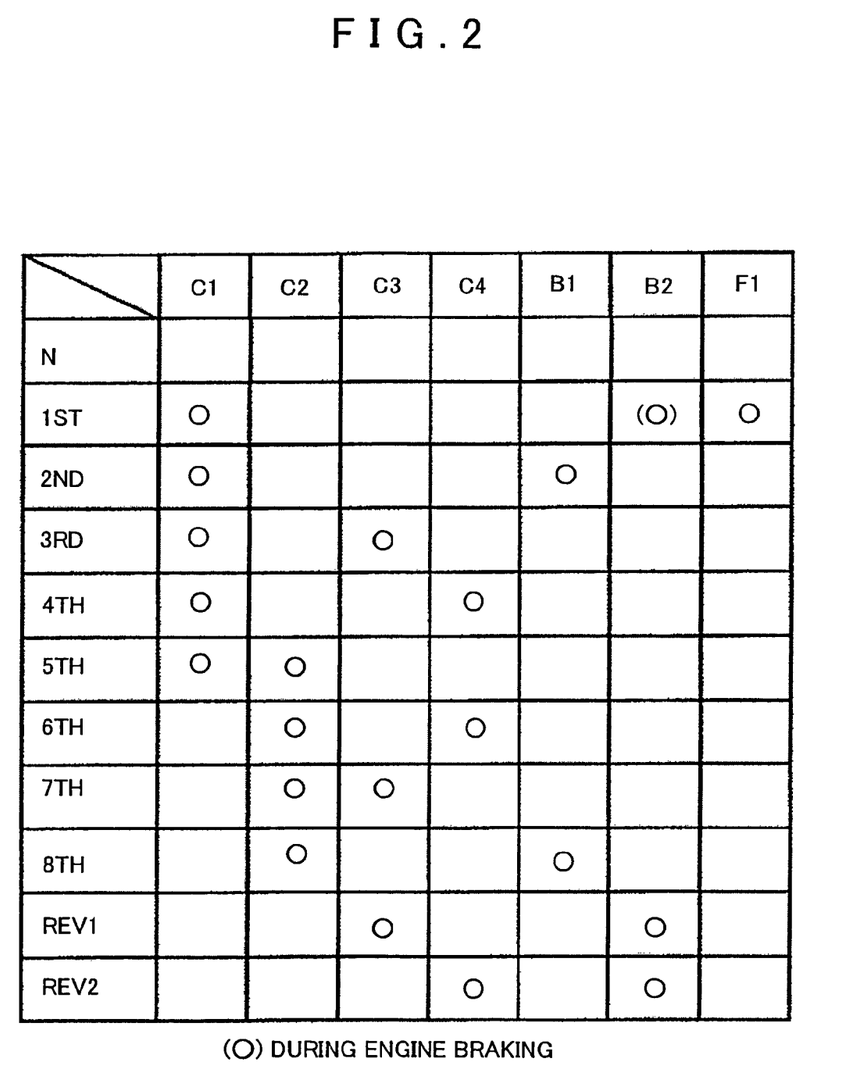
FIG. 2 is an illustrative view showing an operation table of the speed change apparatus.

As shown in the operation table of FIG. 2, the speed change apparatus 20 is capable of switching between first to eighth forward speeds, first and second reverse speeds, and neutral by combining ON/OFF states (ON being an engaged state and OFF being a disengaged state) of the clutches C1 to C4 and ON/OFF states (ON being an engaged state and OFF being a disengaged state) of the brakes B1, B2. The neutral state can be formed by switching the clutches C1 to C4 and the brakes B1, B2 OFF. The first forward speed state can be formed by switching the clutch C1 ON and switching the clutches C2 to C4 and the brakes B1, B2 OFF. In this state, power input into the carrier 34 of the double-pinion type planetary gear mechanism 30 from the input shaft 22 is decelerated by fixing the sun gear 31 and then transmitted to the ring gear 32, and power input into the sun gear 41a of the Ravigneaux type planetary gear mechanism 40 from the ring gear 32 via the clutch C1 is decelerated by fixing the carrier 44 using the one-way clutch F1 and output to the ring gear 42, i.e. the output shaft 24. Thus, the power input into the input shaft 22 is decelerated by a maximum reduction ratio and then output to the output shaft 24. During engine braking in the first forward speed state, the rotation of the carrier 44 is fixed by switching the brake B2 ON instead of by the one-way clutch F1.

The second forward speed state can be formed by switching the clutch C1 and the brake B1 ON and switching the clutches C2 to C4 and the brake B2 OFF. In this state, the power input into the carrier 34 of the double-pinion type planetary gear mechanism 30 from the input shaft 22 is decelerated by fixing the sun gear 31 and then transmitted to the ring gear 32, and the power input into the sun gear 41a of the Ravigneaux type planetary gear mechanism 40 from the ring gear 32 via the clutch C1 is decelerated by fixing the sun gear 41b using the brake B1 and output to the ring gear 42, i.e. the output shaft 24. Thus, the power input into the input shaft 22 is decelerated by a slightly smaller reduction ratio than that of the first forward speed and then output to the output shaft 24.

The third forward speed state can be formed by switching the clutches C1 and C3 ON and switching the clutches C2, C4 and the brakes B1, B2 OFF. In this state, the power input into the carrier 34 of the double-pinion type planetary gear mechanism 30 from the input shaft 22 is decelerated by fixing the sun gear 31 and then transmitted to the ring gear 32, and the power input into the sun gear 41a of the Ravigneaux type planetary gear mechanism 40 from the ring gear 32 via the clutch C1 and input into the sun gear 41b via the clutch C3 is output to the ring gear 42, i.e. the output shaft 24, without being subjected to speed change. Thus, the power input into the input shaft 22 is decelerated by a slightly smaller reduction ratio than that of the second forward speed and then output to the output shaft 24.

The fourth forward speed state can be formed by switching the clutches C1 and C4 ON and switching the clutches C2, C3 and the brakes B1, B2 OFF. In this state, the power input into the carrier 34 of the double-pinion type planetary gear mechanism 30 from the input shaft 22 is decelerated by fixing the sun gear 31 and then transmitted to the ring gear 32, and the power input into the sun gear 41a of the Ravigneaux type planetary gear mechanism 40 from the ring gear 32 via the clutch C1 is accelerated by power output to the sun gear 41b from the input shaft 22 via the carrier 34 and the clutch C4 and then output to the ring gear 42, i.e. the output shaft 24. Thus, the power input into the input shaft 22 is decelerated by a slightly smaller reduction ratio than that of the third forward speed and then output to the output shaft 24.

The fifth forward speed state can be formed by switching the clutches C1 and C2 ON and switching the clutches C3, C4 and the brakes B1, B2 OFF. In this state, the power input into the carrier 34 of the double-pinion type planetary gear mechanism 30 from the input shaft 22 is decelerated by fixing the sun gear 31 and then transmitted to the ring gear 32, and the power input into the sun gear 41a of the Ravigneaux type planetary gear mechanism 40 from the ring gear 32 via the clutch C1 is accelerated by power output to the carrier 44 from the input shaft 22 via the clutch C2 and then output to the ring gear 42, i.e. the output shaft 24. Thus, the power input into the input shaft 22 is decelerated by a slightly smaller reduction ratio than that of the fourth forward speed and then output to the output shaft 24.

The sixth forward speed state can be formed by switching the clutches C2 and C4 ON and switching the clutches C1, C3 and the brakes B1, B2 OFF. In this state, the input shaft 22 is connected to the sun gear 41b of the Ravigneaux type planetary gear mechanism 40 via the clutch C4 and connected to the carrier 44 via the clutch C2, and therefore all of the rotary elements of the Ravigneaux type planetary gear mechanism 40 rotate integrally such that the power input into the input shaft 22 is output to the output shaft 24 at a constant speed.

The seventh forward speed state can be formed by switching the clutches C2 and C3 ON and switching the clutches C1, C4 and the brakes B1, B2 OFF. In this state, the power input into the carrier 34 of the double-pinion type planetary gear mechanism 30 from the input shaft 22 is decelerated by fixing the sun gear 31 and then transmitted to the ring gear 32, and the power output to the carrier 44 of the Ravigneaux type planetary gear mechanism 40 from the input shaft 22 via the clutch C2 is accelerated by the power input into the sun gear 41b from the ring gear 32 via the clutch C3 and then output to the ring gear 42, i.e. the output shaft 24. Thus, the power input into the input shaft 22 is accelerated by a slightly smaller reduction ratio than the constant speed and then output to the output shaft 24.

The eighth forward speed state can be formed by switching the clutch C2 and the brake B1 ON and switching the clutches C1, C3, C4 and the brake B2 OFF. In this state, the power output to the carrier 44 of the Ravigneaux type planetary gear mechanism 40 from the input shaft 22 via the clutch C2 is accelerated by fixing the sun gear 41b using the brake B1 and then output to the ring gear 42, i.e. the output shaft 24. Thus, the power input into the input shaft 22 is accelerated by a slightly smaller reduction ratio than that of the seventh forward speed and then output to the output shaft 24.

The first reverse speed state can be formed by switching the clutch C3 and the brake B2 ON and switching the clutches C1, C2, C4 and the brake B1 OFF. In this state, the power input into the carrier 34 of the double-pinion type planetary gear mechanism 30 from the input shaft 22 is decelerated by fixing the sun gear 31 and then transmitted to the ring gear 32, and the power input into the sun gear 41b of the Ravigneaux type planetary gear mechanism 40 from the ring gear 32 via the clutch C3 is reversed by fixing the carrier 44 using the brake B2 and then output to the ring gear 42, i.e. the output shaft 24. Thus, the power input into the input shaft 22 is decelerated by a comparatively large reduction ratio and output to the output shaft 24 as reverse rotation power.

The second reverse speed state can be formed by switching the clutch C4 and the brake B2 ON and switching the clutches C1 to C3 and the brake B1 OFF. In this state, the power input into the sun gear 41b of the Ravigenaux type planetary gear mechanism 40 from the input shaft 22 via the clutch C4 is reversed by fixing the carrier 44 using the brake B2 and then output to the ring gear 42, i.e. the output shaft 24. Thus, the power input into the input shaft 22 is decelerated by a comparatively small reduction ratio and output to the output shaft 24 as reverse rotation power.

Figure 3:
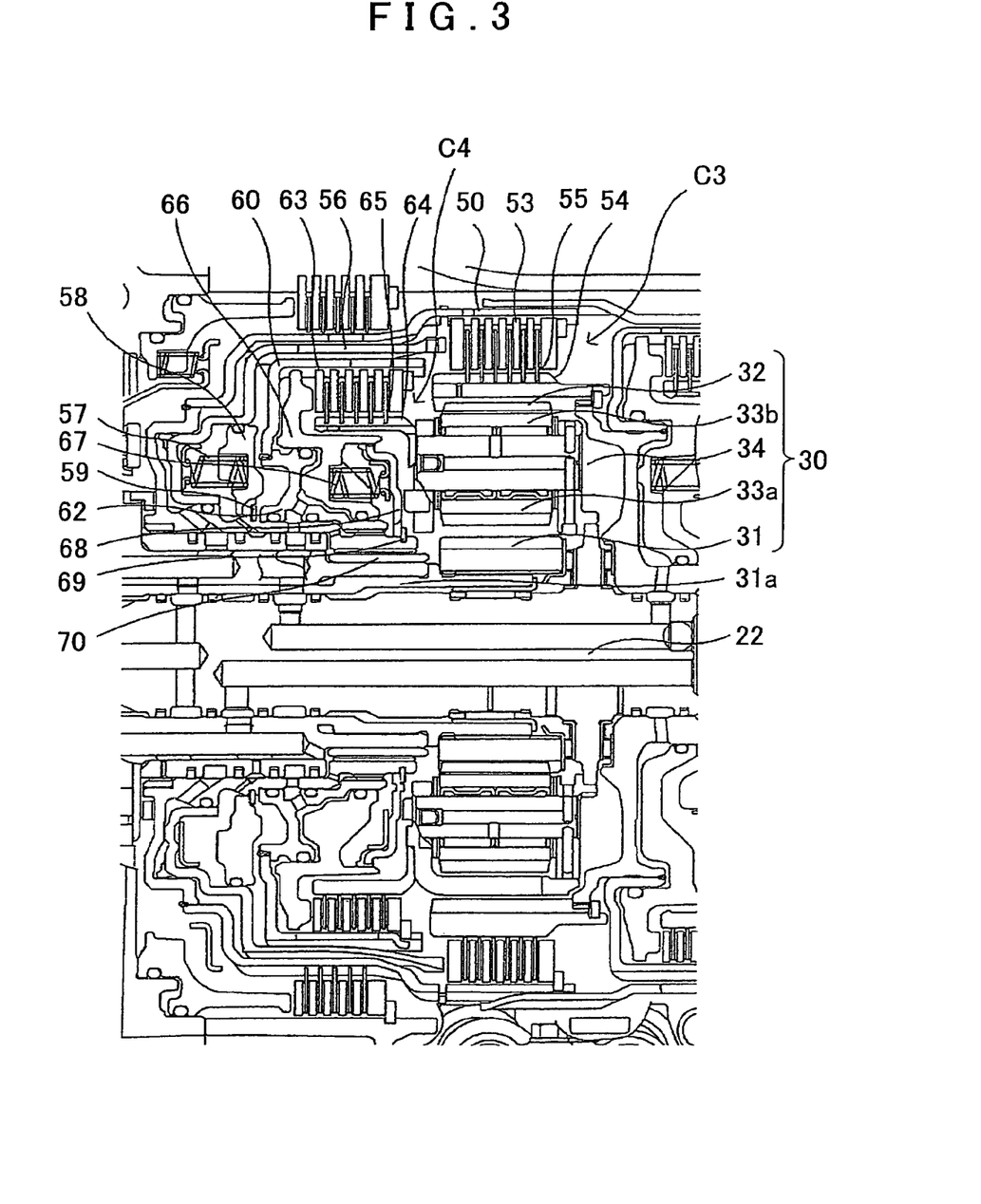
FIG. 3 is a sectional view showing a cross-section of a part of the speed change apparatus.

FIG. 3 is a schematic diagram showing the structure of a part of the speed change apparatus 20 according to the embodiment, centering on the clutch C3 and the clutch C4. As shown in the drawing, the clutch C3 includes a clutch drum 50 fixed to the rotary shaft 36 (see FIG. 1), a clutch hub 54 fixed to the ring gear 32 of the double-pinion type planetary gear mechanism 30, a plurality of annular clutch plates 53, 55 spline-engaged to an inner peripheral surface of the clutch drum 50 and an outer peripheral surface of the clutch hub 54 alternately, a clutch piston 56 capable of sliding to a clutch plate 53, 55 side, a return spring 57 for biasing the clutch piston 56 in an opposite direction to the clutch plate 53, 55 side, and a spring retainer 58 serving as a spring bracket that is latched to the clutch drum 50 by a snap ring 59. The clutch C3 presses the clutch piston 56 against the clutch plates 53, 55 by causing the clutch piston 56 to slide to the clutch plate 53, 55 side using oil pressure from a hydraulic circuit, not shown in the drawing, and as a result, the clutch drum 50 and the clutch hub 54 are engaged by frictional force acting between the clutch plates 53, 55.

The clutch C4 includes a clutch drum 60 disposed in and concentrically with the clutch drum 50 and connected to the clutch drum 50 to be capable of rotating integrally therewith, a clutch hub 64 fixed to the carrier 34 of the double-pinion type planetary gear mechanism 30, a plurality of annular clutch plates 63, 65 spline-engaged to an inner peripheral surface of the clutch drum 60 and an outer peripheral surface of the clutch hub 64 alternately, a clutch piston 66 capable of sliding to a clutch plate 63, 65 side, a return spring 67 for biasing the clutch piston 66 in an opposite direction to the clutch plate 63, 65 side, and spring retainer 68 serving as a spring bracket that is latched to the clutch drum 50 by a snap ring 69. The clutch C4 presses the clutch piston 66 against the clutch plates 63, 65 by causing the clutch piston 66 to slide to the clutch plate 63, 65 side using oil pressure from the hydraulic circuit, and as a result, the clutch drum 60 and clutch hub 64 are engaged by frictional force acting between the clutch plates 63, 65. Note that the clutch drum 50 and the clutch drum 60 are supported to be free to rotate by a cylindrical bush 70 which is attached to a sun gear shaft 31a connected to the sun gear 31 of the double-pinion type planetary gear mechanism 30.

Figure 4:
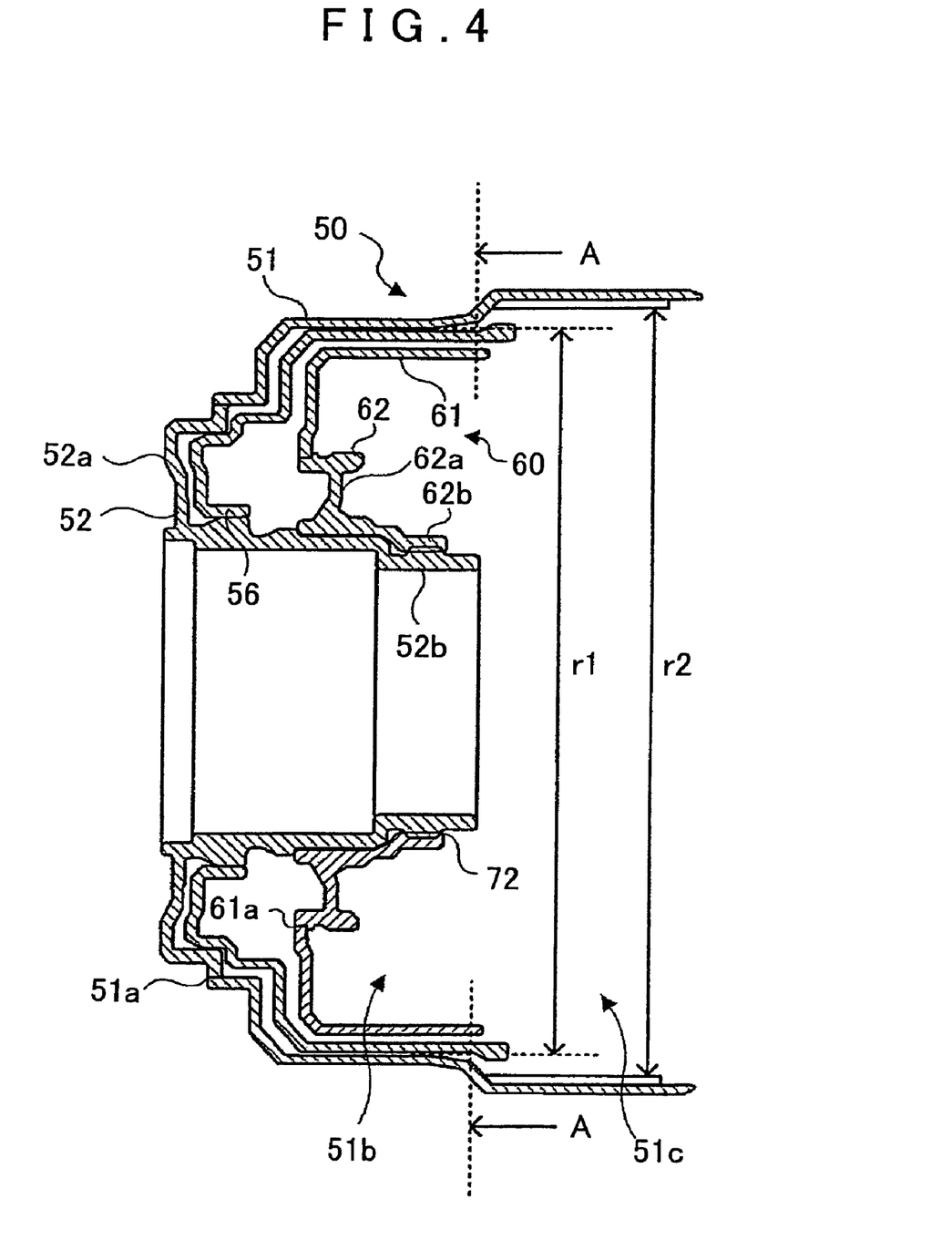
FIG. 4 is a sectional view showing a cross-section of a state in which two clutch drums and a clutch piston are assembled.

FIG. 4 is a sectional view showing a cross-section of a state in which the two clutch drums 50, 60 and the clutch piston 56 are assembled. For ease of description, the clutch hubs 54, 64, the clutch plates 53, 55, 63, 65, the clutch piston 66, the return springs 57, 67, the spring retainers 58, 68, and so on, have been omitted.

As shown in the drawing, the clutch drum 50 is formed by joining together a cylindrical drum member 51 and a base member 52 forming a bottom portion of the clutch drum 50 at a joint portion 51a through welding or the like. The drum member 51 is formed with a first housing portion 51b formed with an inner diameter having a value r1 so as to be capable of housing the clutch C4 (the clutch drum 60, the clutch hub 64, the clutch piston 66, and so on), and a second housing portion 51c formed with an inner diameter having a value r2, which is bigger than the value r1, so as to be capable of housing the double-pinion type planetary gear mechanism 30 and housing the clutch plates 53, 55 between the double-pinion type planetary gear mechanism 30 and the outer peripheral surface of the clutch hub 54, which is formed integrally with the ring gear 32 of the double-pinion type planetary gear mechanism 30. The base member 52 includes a flange portion 52a, an outer peripheral edge of which serves as the joint portion 51a to which the drum member 51 is joined, and a cylindrical boss portion 52b that extends from the flange portion 52a axially.

The clutch drum 60 is formed by joining together a cup-shaped drum member 61 having an opening in the center of a bottom portion thereof and a base member 62 provided as a continuation of the base member 52 at a joint portion 61a through welding or the like. The base member 62 includes a flange portion 62a, an outer peripheral edge of which serves as the joint portion 61a that is joined to the opening in the drum member 61, and a cylindrical boss portion 62b that extends from the flange portion 62a axially. A fitting portion 72 to which the clutch drum 50 and the clutch drum 60 are spline-fitted so as to be capable of rotating integrally is formed on an outer peripheral surface of the boss portion 52b of the base member 52 and an inner peripheral surface of the boss portion 62b of the base member 62.

Figure 5:
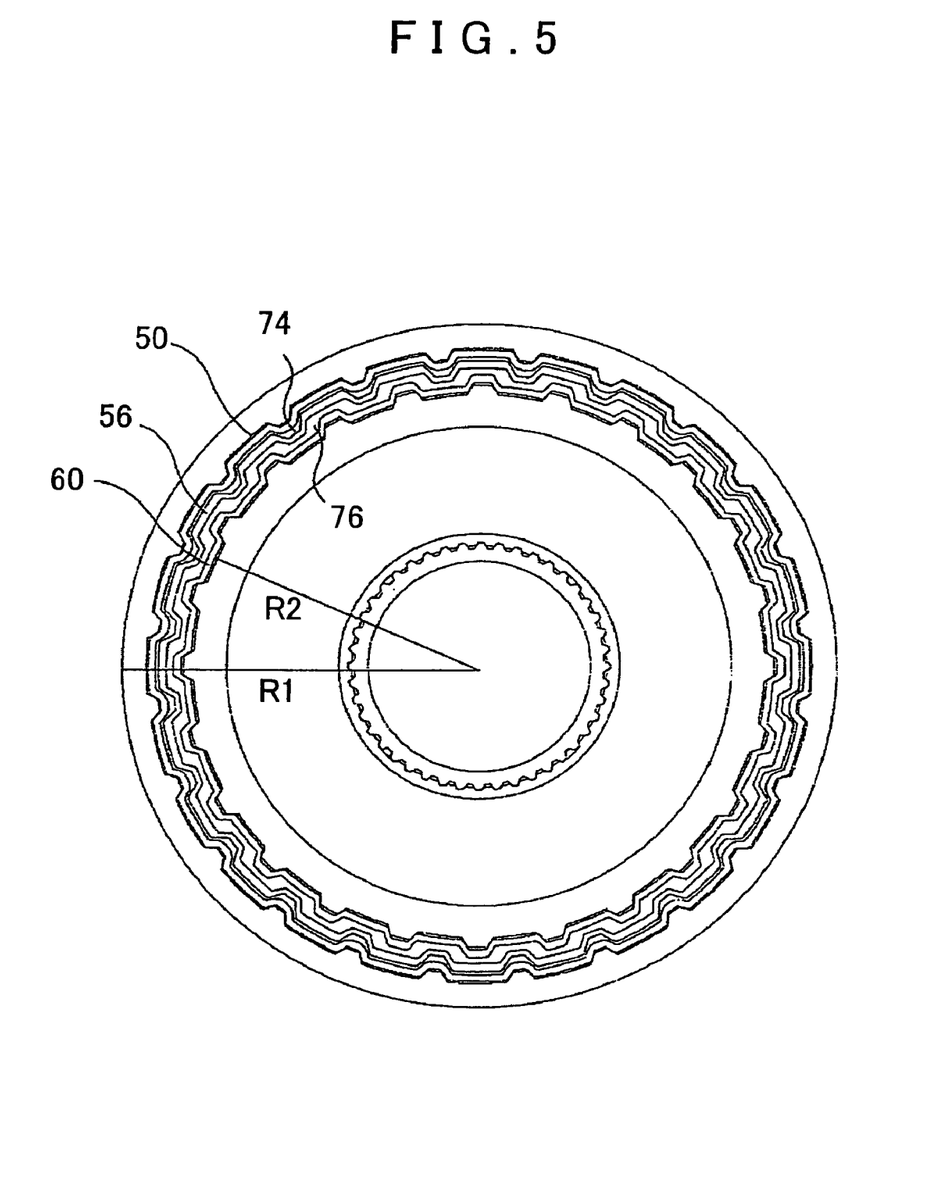
FIG. 5 is a sectional view showing an A-A cross-section of FIG. 4.

FIG. 5 is a sectional view showing an A-A cross-section of FIG. 4. As shown in the drawing, a spline is formed on both the outer peripheral surface and the inner peripheral surface of the clutch piston 56 such that outer peripheral surface spline teeth form inner peripheral surface spline grooves. Similarly, a spline is formed on both the outer peripheral surface and the inner peripheral surface of the clutch drum 60 such that outer peripheral surface spline teeth form inner peripheral surface spline grooves. A fitting portion 74 capable of spline fitting is formed on the inner peripheral surface of the clutch drum 50 and the outer peripheral surface of the clutch piston 56, and a fitting portion 76 capable of spline fitting is formed on the inner peripheral surface of the clutch piston 56 and the outer peripheral surface of the clutch drum 60. The annular clutch plate 63 (see FIG. 3) is spline-fitted to the inner peripheral surface of the clutch drum 60. Hence, the clutch plate 63 can take an outer diameter having a value R2 relative to the outer diameter of the clutch drum 50, which has a value R1.

Figure 6:
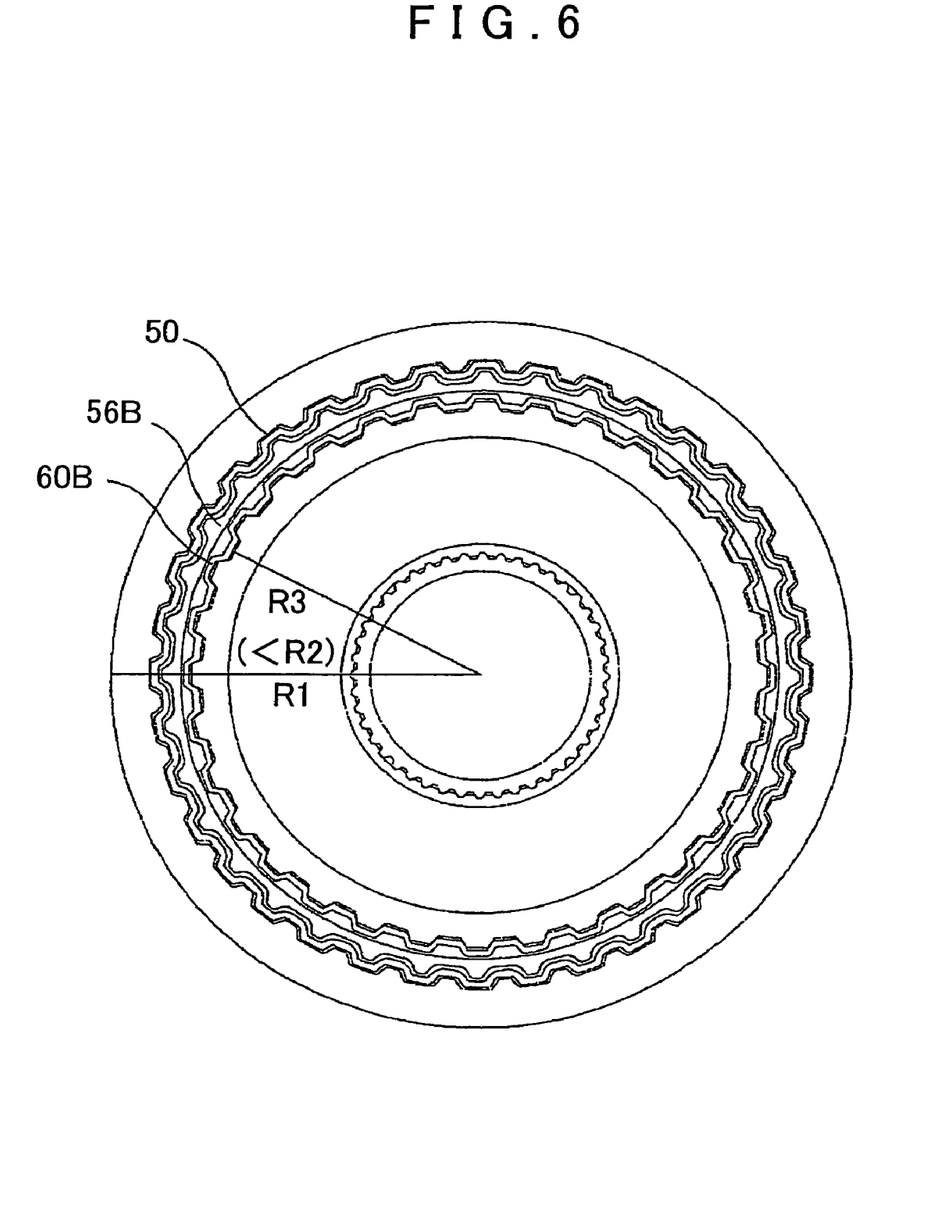
FIG. 6 is a sectional view of a comparative example.

FIG. 6 is a sectional view of a comparative example in which a clutch piston 56B and a clutch drum 60B are not spline-fitted. As shown in the drawing, in a comparative example where a spline is not formed on the inner peripheral surface of the clutch piston 56B, the outer diameter is reduced (to a value R3 that is smaller than the value R2) in accordance with the degree to which the spline teeth of the clutch drum 60B do not fit into the clutch piston 56B. Hence, by forming a spline on both the inner and outer peripheral surfaces of the clutch piston 56 and the clutch drum 60 such that the outer peripheral surface spline teeth form the inner peripheral surface spline grooves and then spline-fitting the two together, the diameter (contact area) of the clutch plates 63, 65 (friction plates) that are fitted to the clutch drum 60 can be increased without increasing the size of the clutch drum 50 in the radial direction, and sufficient torque capacity can be secured by a small number of the clutch plates 63, 65.

In the speed change apparatus 20 of this embodiment, re-clamping of the clutch C3 and the clutch C4 is performed during a switch between the third forward speed and the fourth forward speed, a switch between the sixth forward speed and the seventh forward speed, and a switch between the first reverse speed and the second reverse speed, as shown in the operation table of FIG. 2. In a case where re-clamping does not occur in the clutch C3 and the clutch C4, the clutch piston 56 can be discarded and the clutch drum 60 can be formed to double as the clutch piston 56, and in so doing, the diameter of the clutch plates 63, 65 can be increased comparatively. However, in a case where re-clamping does occur, smooth movement of the clutch drum 60 functioning as a clutch piston is obstructed during the re-clamping, and as a result, torque shock may be generated. Therefore, the clutch piston 56 must be provided separately. Accordingly, the size of the clutch drum 60 in the radial direction is greatly restricted by the clutch piston 56, and it becomes difficult to secure sufficient torque capacity. In this embodiment, however, the clutch piston 56 and the clutch drum 60 are spline-fitted, and therefore, even when restrictions occur on the size of the clutch drum 60 in the radial direction, the clutch plates 63, 65 having a comparatively large diameter can be provided.

As shown in FIG. 5, the fitting portion 74 is formed such that a groove width of the spline groove of the clutch drum 50 is slightly larger than a tooth width of the spline teeth of the clutch piston 56 fitted thereto, and as a result, the clutch drum 50 and the clutch piston 56 are fitted together with a slight clearance therebetween in a circumferential direction. Further, as shown in FIG. 5, the fitting portion 76 is formed such that the groove width of the spline groove of the clutch piston 56 is considerably larger than a tooth width of the spline teeth of the clutch drum 60 fitted thereto, and as a result, the clutch piston 56 and the clutch drum 60 are fitted together with a larger clearance therebetween in the circumferential direction than the clearance of the fitting portion 74. Thus, axial sliding of the clutch piston 56 is not obstructed by the clutch drum 60. The clutch piston 56 is spline-fitted to the clutch drum 50 by the fitting portion 74 and thereby prevented from rotating. However, torque transmission between the clutch drum 50 and the clutch drum 60 is performed by the fitting portion 72 described above, and torque transmission is not performed via the clutch piston 56.

As described above, the two clutch drums 50, 60 are spline-fitted so as to be connected integrally by the fitting portion 72 and spline-fitted via the clutch piston 56 by the fitting portions 74, 76. Hence, positioning of the spline teeth of the fitting portion 72 and the spline teeth of the fitting portions 74, 76 must be performed. In this embodiment, the clutch drum 50 is manufactured by forming splines in the required locations of the drum member 51 and the base member 52, positioning the splines, fixing the drum member 51 and the base member 52 using a fixing jig capable of fixing the drum member 51 and the base member 52 after aligning the joint portion 51a, and then welding the joint portion 51a. The clutch drum 60 is manufactured using a similar method. This is the reason for forming the clutch drums 50, 60 by two members, namely the respective drum members 51, 61 and the respective base members 52, 62.

According to the speed change apparatus 20 of the embodiment described above, the clutch drums 50, 60 are disposed concentrically in layered form, and the clutch piston 56 and the clutch drum 60 are spline-fitted by forming splines on both the inner and outer peripheral surfaces of the clutch piston 56 and the clutch drum 60 such that the outer peripheral surface spline teeth form inner peripheral surface spline grooves. Hence, the diameter (contact area) of the clutch plates 63, 65 that are fitted to the clutch drum 60 can be increased without increasing the size of the clutch drum 50 in the radial direction, and sufficient torque capacity can be secured. As a result, the number of clutch plates 63, 65 can be reduced, enabling a reduction in the overall length (the axial direction length) of the apparatus. By disposing the clutch drums 50, 60 concentrically in layered form, the speed change apparatus 20 can be installed efficiently even in an FR type automobile 10, in which radial direction size is greatly restricted. Moreover, the fitting portion 76 is formed such that the clutch piston 56 and the clutch drum 60 are fitted together with greater leeway in the circumferential direction than the fitting portion 74, and therefore, even if the clutch piston 56 rotates slightly in the circumferential direction, contact with the clutch drum 60 can be suppressed. As a result, the clutch drum 60 can be preventing from obstructing the sliding of the clutch piston 56. Further, the clutch drum 50 and the clutch drum 60 are respectively formed by two members, namely the drum members 51, 61 and the base members 52, 62, and therefore spline tooth positioning can be performed easily when the clutch drum 50 and the clutch drum 60 are spline-fitted so as to be connected integrally by the fitting portion 72 and spline-fitted via the clutch piston 56 by the fitting portions 74, 76.

In the speed change apparatus 20 according to this embodiment, the clutch drum 50 and the clutch drum 60 corresponding to the clutch C3 and the clutch C4 are spline-fitted such that torque transmission is performed by the fitting portion 72, and spline-fitted via the clutch piston 56 such that torque transmission is not performed. However, in a speed change apparatus having a specification in which re-clamping is not performed between two clutches disposed in layered form, an outside clutch drum and an inside clutch drum may be formed such that torque transmission is performed therebetween. In this case, there is no need to provide a separate fitting portion for connecting the outside clutch drum and the inside clutch drum to be capable of rotating integrally. Note that in this case, the inside clutch drum may be formed to double as a clutch piston for pressing the clutch plates attached to the outside clutch drum.

In the speed change apparatus 20 according to this embodiment, the inner peripheral surface of the clutch drum 50 and the outer peripheral surface of the clutch piston 56 are spline-fitted, but need not be spline-fitted. In this case, a baffle mechanism for halting rotation of the clutch piston may be provided separately.

In the speed change apparatus 20 according to this embodiment, the clutch drum 50 and the clutch drum 60 are respectively formed by adhering together two members, namely the drum members 51, 61 and the base members 52, 62, but one or both of the clutch drum 50 and the clutch drum 60 may be formed by three or more members or a single member.

In the speed change apparatus 20 according to this embodiment, an eight-speed, hydraulically driven stepped transmission is used, but as long as the transmission is a stepped transmission, the number of shift speeds is not limited to eight, and a transmission having any number of shift speeds, for example two to seven shift speeds or nine or more shift speeds, may be used.

In the embodiment, the clutch C1, the clutch C2, the clutch C3, the clutch C4, the brake B1 and the brake B2 are examples of a "third clutch", a "fourth clutch", a "first clutch", a "second clutch", a "first brake" and a "second brake", respectively. Further, the dram member 51 is an example of a "first member", the base member 52 is an example of a "second member", the drum member 61 is an example of a "third member", and the base member 62 is an example of a "fourth member". As should be appreciated, these examples do not limit the elements of the invention described above as other examples should be readily understood by one skilled in the art. In other words, the present invention may be implemented in various forms within a scope that does not depart from the spirit of the present invention. For example, the present invention may be used in the manufacturing industry for speed change apparatuses.

According to an exemplary aspect of the invention, the diameter of the clutch plate that is spline-fitted to the inner peripheral surface of the second clutch drum can be increased without increasing the size of the first clutch drum in a radial direction. As a result, the size of the apparatus can be reduced while securing a required torque capacity. Here, the term "clutch" includes a normal clutch for connected two rotation systems, and a brake for connecting one rotation system to a fixed system such as a case.

According to an exemplary aspect of the invention, the diameter of the clutch plate that is spline-fitted to the inner peripheral surface of the second clutch drum can be increased even further, the second clutch drum can be prevented from obstructing axial movement of the clutch piston, and positioning of the spline teeth can be performed more easily.

According to an exemplary aspect of the invention, the overall size of the apparatus can be reduced while securing the required torque capacity in the second clutch, and the second clutch, which requires a comparatively large torque capacity, can secure this torque capacity.

According to an exemplary aspect of the invention, the effects of the present invention when applied to a vertical transmission, in which size restrictions in the radial direction are particularly large, can be exhibited even more strikingly.

What is claimed is:

1. A speed change apparatus, comprising:
   a first clutch having a first clutch drum, in which an annular clutch plate is spline-fitted to an inner peripheral surface of the first clutch drum, and a clutch piston formed with a spline on an inner peripheral surface of the clutch piston is provided to slide in an axial direction and press the clutch plate; and
   a second clutch having a second clutch drum, which is disposed in the clutch piston of the first clutch concentrically with the first clutch, and in which a spline is formed on inner and outer peripheral surfaces of the second clutch drum such that outer peripheral surface spline teeth form inner peripheral surface spline grooves,
   wherein the outer peripheral surface of the second clutch drum is spline-fitted to the inner peripheral surface of the clutch piston and an annular clutch plate is spline-fitted to the inner peripheral surface of the second clutch drum.

2. The speed change apparatus according to claim 1, wherein:
   a spline is formed on inner and outer peripheral surfaces of the clutch piston such that outer peripheral surface spline teeth of the clutch piston form inner peripheral surface spline grooves, and
   the outer peripheral surface of the clutch piston is spline-fitted to the inner peripheral surface of the first clutch drum and the inner peripheral surface of the clutch piston is spline-fitted to the outer peripheral surface of the second clutch drum.

3. The speed change apparatus according to claim 2, wherein the splines on the inner peripheral surface of the clutch piston and the outer peripheral surface of the second clutch drum are formed such that the spline grooves and the spline teeth are fitted together with more spatial leeway in a circumferential direction than a spline fitting between the inner peripheral surface of the first clutch drum and the outer peripheral surface of the clutch piston.

4. The speed change apparatus according to claim 2, wherein the first clutch drum and the second clutch drum are connected to rotate integrally by a spline fitting provided in a different continuous site to a site in which the first clutch drum and the second clutch drum are spline-fitted to each other via the clutch piston.

5. The speed change apparatus according to claim 4, wherein:
   the first clutch drum includes a first member formed with spline teeth that are spline-fitted to the clutch piston, and a second member formed with spline teeth that are spline-fitted to the second clutch drum,
   the second clutch drum includes a third member formed with spline teeth that are spline-fitted to the clutch piston, and a fourth member formed with spline teeth that are spline-fitted to the first clutch drum, and
   a connection between the first member and the second member and a connection between the third member and the fourth member are realized in a state where the spline teeth are positioned such that the first clutch drum and the second clutch drum are spline-fitted via the clutch piston and spline-fitted in the continuous site.

6. The speed change apparatus according to claim 1, further comprising:
   a first planetary gear mechanism that includes four rotary elements, in which a first rotary element is connected to a third clutch, a second rotary element is connected to a rotary shaft, a third rotary element is connected to an output shaft, and a fourth rotary element is fixed to a case via a one-way clutch and connected to an input shaft via a fourth clutch; and
   a second planetary gear mechanism that includes three rotary elements, in which a first rotary element is fixed to the case, a second rotary element is connected to the rotary shaft via a first clutch and connected to the first rotary element of the first planetary gear mechanism via the third clutch, and a third rotary element is connected to the input shaft and connected to the rotary shaft via a second clutch, wherein:
   the rotary shaft is fixed to the case via a first brake,
   the fourth rotary element of the first planetary gear mechanism is fixed to the case via a second brake.

7. The speed change apparatus according to claim 6, wherein the second planetary gear mechanism is formed as a deceleration mechanism that decelerates power input into the third rotary element and outputs the decelerated power to the third rotary element.

8. The speed change apparatus according to claim 1, wherein the speed change apparatus is a stepped transmission installed in a vehicle.

9. The speed change apparatus according to claim 8, wherein the speed change apparatus is a vertically disposed transmission disposed vertically such that an input shaft and an output shaft are formed in an orthogonal direction to an axle.

10. The speed change apparatus according to claim 1, wherein:
    a first fitting portion is formed on the inner peripheral surface of the first clutch drum and an outer peripheral surface of the clutch piston, and
    the first fitting portion is formed such that a groove width of a spline groove of the first clutch drum is larger than a tooth width of spline teeth of the clutch piston.

11. The speed change apparatus according to claim 10, wherein:

a second fitting portion is formed on the inner peripheral surface of the clutch piston and the outer peripheral surface of the second clutch drum, and the second fitting portion is formed such that a groove width of a spline groove of the clutch piston is larger than a tooth width of spline teeth of the second clutch drum.

12. The speed change apparatus according to claim 11, wherein the clutch piston and the second clutch drum are fitted together with a larger clearance there between in the circumferential direction than a clearance of the first clutch drum and the clutch piston.

13. The speed change apparatus according to claim 11, wherein the first clutch drum and the second clutch drum are spline-fitted so as to be connected integrally by a third fitting portion.

14. The speed change apparatus according to claim 1, wherein the first clutch drum and the second clutch drum each include a drum member and a base member.

* * * * *